United States Patent
Marke et al.

(10) Patent No.: US 8,055,980 B2
(45) Date of Patent: *Nov. 8, 2011

(54) ERROR PROCESSING OF USER INFORMATION RECEIVED BY A COMMUNICATION NETWORK

(75) Inventors: Matthias Marke, Gröbenzell (DE); Wen Xu, Unterhaching (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

This patent is subject to a terminal disclaimer.

(21) Appl. No.: 10/523,509

(22) PCT Filed: Jul. 10, 2003

(86) PCT No.: PCT/DE03/02330
§ 371 (c)(1),
(2), (4) Date: Mar. 11, 2005

(87) PCT Pub. No.: WO2004/021631
PCT Pub. Date: Mar. 11, 2004

(65) Prior Publication Data
US 2005/0268198 A1   Dec. 1, 2005

(30) Foreign Application Priority Data

Aug. 6, 2002 (EP) .......................... PCT/EP02/08782
Sep. 4, 2002 (DE) .................................. 102 40 905

(51) Int. Cl.
*H03M 13/00* (2006.01)
(52) U.S. Cl. ......................... 714/774; 714/780
(58) Field of Classification Search .................. 714/774, 714/780
See application file for complete search history.

(56) References Cited

U.S. PATENT DOCUMENTS

| | | | | |
|---|---|---|---|---|
| 4,189,779 A * | 2/1980 | Brantingham | ................ | 704/265 |
| 4,507,779 A * | 3/1985 | Barner et al. | ................ | 370/505 |
| 5,122,875 A * | 6/1992 | Raychaudhuri et al. | ... | 348/390.1 |
| 5,134,464 A * | 7/1992 | Basile et al. | ................ | 348/487 |
| 5,142,537 A * | 8/1992 | Kutner et al. | ................ | 714/747 |
| 5,224,105 A * | 6/1993 | Higley | ................ | 714/748 |
| 5,357,204 A * | 10/1994 | Knoll | ................ | 327/259 |
| 5,414,766 A * | 5/1995 | Cannalire et al. | ........ | 379/406.08 |
| 5,675,808 A * | 10/1997 | Gulick et al. | ................ | 713/322 |
| 5,699,405 A | 12/1997 | Suzuki | | |
| 5,805,909 A * | 9/1998 | Diewald | ................ | 713/322 |
| 6,029,264 A * | 2/2000 | Kobayashi et al. | ........... | 714/755 |
| 6,209,112 B1 * | 3/2001 | Stevenson | ................ | 714/752 |
| 6,212,645 B1 * | 4/2001 | Tjandrasuwita | ............. | 713/330 |

(Continued)

FOREIGN PATENT DOCUMENTS

EP    0 982 904    3/2000

(Continued)

OTHER PUBLICATIONS

Dorbecker M et al., "The cellular text telephone modem—the solution for supporting text telephone functionality in GSM networks" pp. 1441-1444 vol. 3 XP 002261951 2001.

(Continued)

*Primary Examiner* — Joseph D Torres

(57) ABSTRACT

A method is provided for decoding and/or detecting data containing user information which is received by a communication network in order to provide a way to suppress error concealment and to provide improved error correction. The present invention is characterized in that a receiver of a communication terminal and a CTM-receiver exchange at least additional information relating to the reliability of the correct reception of the data thus received and that error processing of the data thus received is adjusted in a receiver.

14 Claims, 1 Drawing Sheet

U.S. PATENT DOCUMENTS

| | | | |
|---|---|---|---|
| 6,282,631 B1 * | 8/2001 | Arbel | 712/35 |
| 6,310,915 B1 * | 10/2001 | Wells et al. | 375/240.03 |
| 6,345,251 B1 * | 2/2002 | Jansson et al. | 704/270 |
| 6,606,722 B1 * | 8/2003 | Haimi-Cohen | 714/746 |
| 6,611,804 B1 * | 8/2003 | Dorbecker et al. | 704/271 |
| 7,408,986 B2 * | 8/2008 | Winder | 375/240.12 |
| 7,558,320 B2 * | 7/2009 | Winder et al. | 375/240.12 |
| 2004/0228325 A1 * | 11/2004 | Hepworth et al. | 370/352 |
| 2005/0229046 A1 * | 10/2005 | Marke et al. | 714/100 |

FOREIGN PATENT DOCUMENTS

| | | |
|---|---|---|
| WO | WO 96/32817 | 10/1996 |
| WO | WO 01/11840 | 2/2001 |

OTHER PUBLICATIONS

Patent Abstracts of Japan vol. 012, No. 449 (E-686) Nov. 25, 1988 & JP 63 176037—Jul. 20, 1988.

Transport of text in the voice channel (3GPP TS 26, 226 version 5.0.0 Release 5) Mar. 2001.

Patent Abstracts of Japan—vol. 12, No. 449, Nov. 25, 1988 and JP 63 176037 Jul. 20, 1988.

XP-002261951—Dorbecker et al., "The cellular text telephone modem—the solution for supporting text telephone functionality in GSM networks", 2001 IEEE International Conference on Acoustics, Speech and Signal Processing, May 7-11, 2001, pp. 1441-1444.

* cited by examiner

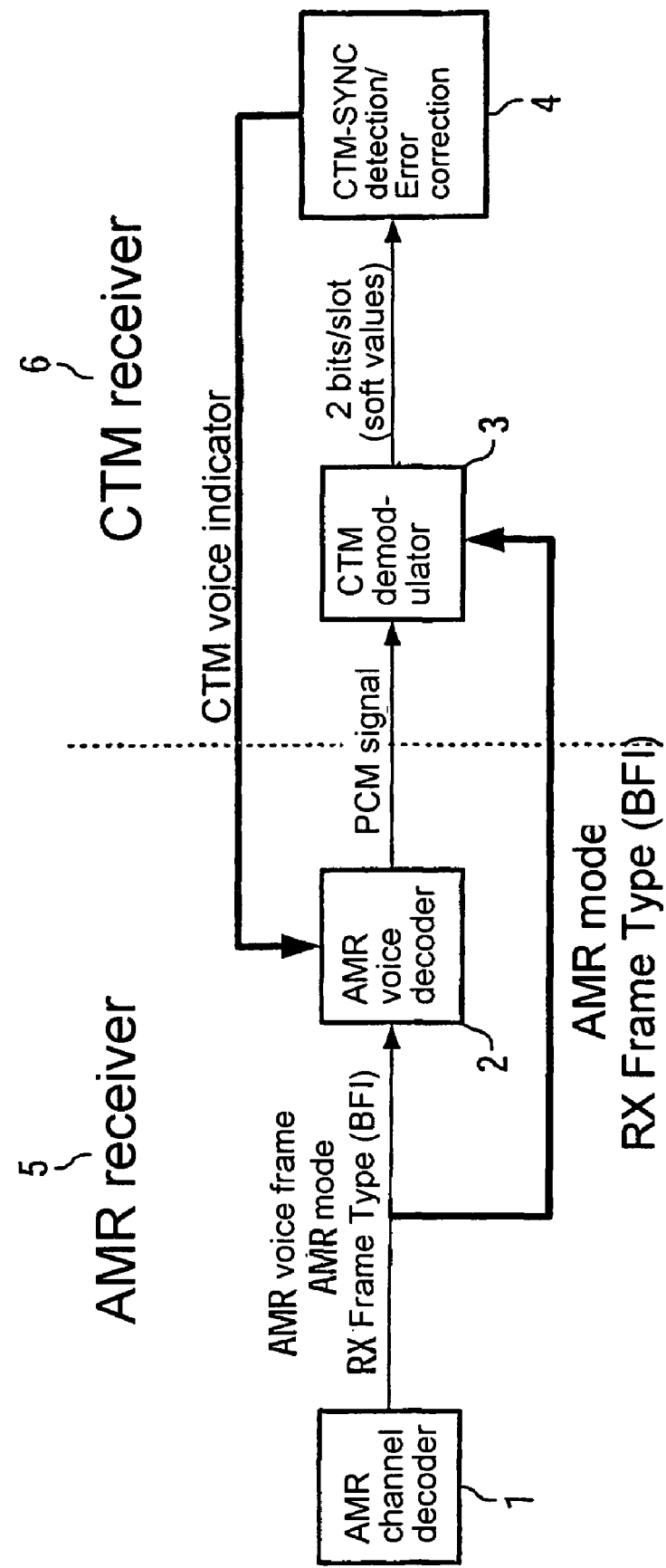

ERROR PROCESSING OF USER INFORMATION RECEIVED BY A COMMUNICATION NETWORK

BACKGROUND OF THE INVENTION

The present invention relates to a method and a system for error correction of user information received via a communication network.

Document D1 U.S. Pat. No. 5,699,405 describes how data and voice signals of a communications information signal of a cellular radio telephone are decoded simultaneously by two decoders. A data signal of the information signal is decoded by a data decoder, and then a data signal sensor decides whether the decoded signal is a normal data signal. Only a normal signal is forwarded to a signal converter for executing a code conversion. The resultant signal is output by a transmitter circuit. A voice signal of the information signal is decoded by a voice decoder, and then a voice signal sensor decides whether the decoded signal is a normal voice signal. Only a normal signal is sent to a digital/analog converter for transforming into an analog voice signal. The validity of the decoded signals is verified, for example, by varying the frequency band and/or the amplitude of the decoded signals. Due to the simultaneous decoder operations, the data and the voice signals are decoded efficiently at high speed by one modem card. As such, there is one modem card for a cellular radio telephone for simultaneous transmission of data signals and voice signals to an information terminal, where an information terminal may be a computer.

In cellular text telephony, a cascade of a cellular radio receiver (e.g., GSM modem) and a CTM receiver (Cellular Text telephone Modem) is provided for received texts. An example of this is the U.S. American text telephony standard (see 3GPP TS 26.226) wherein text is first converted into audio signals by digital coding of an alphabet, channel coding and frequency modulation, and then the audio signals are processed further in the same way as normal speech by cellular radio terminals (cellular radio modems) and transmitted via a cellular radio channel. In order to guarantee the reliable transmission of emergency calls, maximum error rates are specified for the transmission of the individual letters (see 3GPP TS 26.231). A CTM receiver and a cellular radio receiver are not highly compatible, however, and the complete system (cellular radio+CTM) cannot achieve sufficiently good performance, particularly in the sense of transmission efficiency, for the following reasons:

A cellular radio voice coder/decoder (such as the AMR) in cellular radio is optimized for coding/decoding of human speech. For the artificially generated (CTM) audio signals, the voice coder/decoder is not efficient.

Under poor channel conditions, the error concealment, which is optimized for the human ear, is no longer satisfactory for the transmission of text information.

Accordingly, the present invention is directed toward a method and a device in a communication network that will better satisfy requirements in the transmission of data containing user information.

SUMMARY OF THE INVENTION

Pursuant to the present invention, the transmission characteristic of the voice channel, in combination with additionally conveyed data on the data rate of the voice coder and the channel quality determined in the channel decoder, is converted in the CTM receiver into a reliability measure. This reliability measure is used in the error correction of the received data in the CTM receiver in order to reconstruct the transmit signal with as few errors as possible. During the decoding of the voice-channel signal, particularly in the AMR voice decoder, there is also the option to disable voice-synthesis mechanisms that are optimized for the human ear and have a detrimental effect on the transmission of audio signals (error concealment). As such, the information in the CTM receiver that a CTM-text audio signal is being transmitted, is conveyed to the voice decoder so as to optimize the voice synthesis for user information (CTM-text audio signal) and not for human speech. A piece of user information is the information that is inserted into the stream of data at the transmitter end, and re-extracted from the data at the receiver end, such as text, voice signals, image signals, video signals etc., where the data is the received signals that are coded in a typical way for the transmission.

Some pieces of additional information are exchanged between the CTM receiver and the communication terminal receiver, for instance a cellular radio terminal, fixed network terminal, etc., primarily the BFI and AMR-mode parameters from the communication terminal receiver, and the CTM-signal indicator from the CTM text receiver. The performance of the overall system is improved substantially thereby. Since the inventive method only relates to the receiver end, the standard is unaffected.

The additional information that the CTM receiver receives can be used selectively to compensate for the disadvantages described for the transmission of data containing user information via voice coders. According to the present invention, the voice decoder can suppress error-concealment mechanisms when information is present that data containing user information is being transmitted. The transmission efficiency is thereby increased significantly, and the stipulated maximum error rates can be met, which, for instance, is a precondition for the sale of cellular radio equipment in the U.S.A.

Additional features and advantages of the present invention are described in, and will be apparent from, the following Detailed Description of the Invention and the Figures.

BRIEF DESCRIPTION OF THE FIGURES

FIG. 1 shows a simplified representation of the suppression of the error concealment in the voice decoding and error correction with the aid of the additional information relating to the data to be transmitted.

DETAILED DESCRIPTION OF THE INVENTION

FIG. 1 shows how the AMR channel decoder 1 in an AMR receiver 5 receives the transmitted data from the equalizer in the form of TDMA bursts, and corrects channel errors as far as possible. The AMR channel decoder identifies from a checksum (CRC) whether the channel-decoded AMR voice frame is usable or unusable (in the sense of containing too many errors as a result of the transmission).

The AMR channel decoder 1 passes to the AMR voice decoder 2 the decoded voice frame, the AMR mode and the additional information as to whether the frame is usable. The latter piece of information is contained in the RX_FRAME_TYPE parameter (BFI=Bad Frame Indicator). The AMR voice decoder 2 uses the BFI so as not to convert unusable frames into voice (audio signal) but, in this case, to synthesize the audio signal from frames from the past in such a way that the human ear only perceives a minimum interference (error concealment). This mechanism can be disabled if it is signaled via the CTM text/voice indicator that data (CTM signal) containing user information is being transmitted. At the output of the module is a PCM signal (Pulse Code Modulation). The BFI can be transmitted in unused bits (LSB) of the PCM signal. An advantage here is that one can implement the exchange of the additional information using the existing hardware.

The CTM receiver 6 includes, amongst other components, a demodulator unit 3 and an error correction module 4. In the former, two bits are generated from 40 PCM signal values, such bits being included in frequency modulated form in the PCM signal. The bits contain reliability information ("soft values") that indicates the likelihood of the decoded data matching the originally transmitted data. The reliability information is erroneously high for CTM-text user data if the 40 signal values originate from an AMR frame that has actually been received as unusable. This is because, due to error concealment, the signal has few acoustic interference components, but the frequency modulated information is taken from a voice frame of the past and, thus, cannot be used at the present moment in time. The demodulator 3, however, receives from the AMR channel decoder 1 the AMR-mode and RX Frame Type (in this case, the BFI) information. This is used in the calculation of the reliability information, and the transmission efficiency is increased.

In the CTM receiver 6, the demodulated CTM-text bits are scanned for a synchronization sequence, which is a sequence of specific frequencies indicating that a CTM text follows. If this sequence is detected, the CTM text/voice indicator is set to the value "CTM text" and forwarded to the AMR voice decoder 2, so that the error concealment is suppressed. At the end of the CTM-text user-data transmission, which is signaled with IDLE characters by the transmitter, the indicator is re-set to the value "voice," and the error concealment can be re-enabled.

Although the present invention has been described with reference to specific embodiments, those of skill in the art will recognize that changes may be made thereto without departing from the spirit and scope of the present invention as set forth in the hereafter appended claims.

The invention claimed is:

1. A method for decoding data received via a communications network, the method comprising:
    sending a text/voice indicator from a cellular text telephone modem to a voice decoder of a communication terminal receiver;
    disabling error concealment in the voice decoder if the text/voice indicator indicates that the data is cellular text telephone modem text data; and
    using the voice decoder with error concealment disabled to forward a pulse code modulation signal to a cellular text demodulator.

2. A method as claimed in claim 1, including modifying an error correction of the data in an error-correction module of the cellular text telephone modem.

3. A method as claimed in claim 2, wherein at least one piece of additional information concerning the data to be exchanged is forwarded by the communication terminal receiver to the cellular text telephone modem for controlling the error correction of the data.

4. A method as claimed in claim 1, wherein the communication network is a cellular mobile communication network.

5. A method as claimed in claim 4, wherein additional information, which is at least one of a bad frame indicator and an adaptive multi-rate mode, is exchanged between the communication terminal receiver and the cellular text telephone modem.

6. A method as claimed in claim 1, wherein the communication terminal receiver is a receiver in a cellular radio terminal.

7. A method as claimed in claim 1, wherein at an end of a cellular text telephone modem text transmission, the text/voice indicator is set to a value which indicates that subsequently received data contains voice information.

8. A method as claimed in claim 1, wherein the communication terminal receiver is an adaptive multi-rate receiver.

9. A method as claimed in claim 1, wherein at least one piece of additional information indicative of data reception reliability is added by the communication terminal receiver to the received data.

10. A method as claimed in claim 1, wherein at least one piece of information concerning the data to be exchanged is transmitted in unused bits of the data.

11. A method as claimed in claim 1, wherein additional information received by the cellular text telephone modem is used for error correction of the data.

12. A method as claimed in claim 1, wherein a reliability measure concerning at least one of a quality of cellular radio transmission, demodulation and decoding of the data is calculated by the cellular text telephone modem from a quality of a channel decoder of the communication terminal receiver and a data rate of the voice decoder.

13. A method as claimed in claim 12, wherein the reliability measure is used for error correction of the user information in the cellular text telephone modem.

14. A method as claimed in claim 1, wherein the data includes at least one of text, voice signals, image signals and video signals.

\* \* \* \* \*

UNITED STATES PATENT AND TRADEMARK OFFICE
CERTIFICATE OF CORRECTION

PATENT NO. : 8,055,980 B2  
APPLICATION NO. : 10/523509  
DATED : November 8, 2011  
INVENTOR(S) : Matthias Marke et al.

It is certified that error appears in the above-identified patent and that said Letters Patent is hereby corrected as shown below:

In Sheet 1 of 1, line 1, below "Reference numeral 4" insert -- Fig. 1 --.

Signed and Sealed this  
Ninth Day of October, 2012

David J. Kappos  
*Director of the United States Patent and Trademark Office*